D. R. McADAMS
R. J. HARRIS
INVENTORS

D. R. McADAMS
R. J. HARRIS INVENTORS

BY Llewellyn A. Proctor

PATENT ATTORNEY

United States Patent Office 3,412,749
Patented Nov. 26, 1968

3,412,749
CAPILLARY FLOW VALVES
Don R. McAdams and Rano J. Harris, Baton Rouge, La., assignors to Esso Research and Engineering Company, a corporation of Delaware
Filed Apr. 8, 1966, Ser. No. 541,363
10 Claims. (Cl. 137—240)

ABSTRACT OF THE DISCLOSURE

A capillary flow valve, useful alone and in various combinations, for initiating, controlling, and interrupting the flow of fluid to and from analytical instruments, e.g., gas chromatographs or mass spectrometers. A capillary chamber is provided with lateral openings for connection with conduits for supplying fluid to the chamber. The chamber can be opened or closed to the conduits by movement of a plunger which is mounted within the chamber, and a frusto conic opening at the forward end of the chamber can be opened or closed to the flow of fluid therethrough by movement of the plunger to seat and unseat the terminal end thereof which mates with the frusto conic opening. Preferably, the plunger is of relatively small diameter, and volumetric difference between the external diameter of the said plunger and the capillary chamber is such as to provide an effective flow area substantially equal to that through the frusto conic opening. The inner sections of the conduits connecting to the lateral openings and the chamber are abutted together and housed within blocks. The block housing at the forward lateral opening also contains a separate member or capillary which provides the frusto conic opening.

---

This invention relates to capillary flow valves for closing off, initiating, and controlling the flow of fluids to and from modern analytical instrument systems. In particular, it relates to low internal volume capillary flow valves, for use alone or in combinations, to permit fluid flow in capillary tubing systems to be selectively controlled, isolated and switched from one analytical instrument system to another.

The art is replete with disclosures of fluid flow systems wherein devices, e.g., valves, of many types are employed for initiating, interrupting, throttling, or controlling, directly or indirectly, the flow of fluids through conduits. The vast majority of these systems are concerned only with macro-flow systems. In such systems, the flow of fluids, if not entirely turbulent, is subject to considerable back-mixing, even where the flow velocity remains relatively constant. These valves serve their purpose but are, of course, hardly suitable for the needs of modern analytical instrument systems which require the handling of micro quantities of complex mixtures of fluids. Especially is this so where the instrumental systems are operated at relatively high temperatures and pressures and under conditions wherein it is desirable or necessary to switch the flow from one instrument to another, particularly where two or more instruments are operated at different elevated pressures.

Valves, with capillary type openings through which fluids are passed, are expressly designed for handling very small quantities or streams of fluids moving at relatively slow velocities. Even these valves are generally inadequate to fit many of the needs of modern analytical instrument systems. For example, certain of these valves are of a type containing a capillary conduit located within a movable member. The movable member is located at a junction of a capillary passage and can be moved for alignment of its conduit with the passageway to open the valve, or moved out of alignment to close the valve. One type contemplates an inner rotatable member provided at a junction wherein capillary conduits enter and exit. The rotatable member is located at a junction between the entering and exiting capillary conduits, and serves by rotation of the member as a means for initiating and interrupting flow of fluid through the said primary capillary conduits. Other innovations, e.g., are multi-port valves which employ slideable spools provided with capillary openings, which act as junctions for initiating flow of fluid by alignment of the capillary openings of the spool with the entering and exiting ends of a conduit; or, conversely, to close off flow by moving the capillary openings of the spool out of alignment with the terminal openings. Such valves are not entirely satisfactory for present needs. There are numerous deficiencies associated with such devices, and this is particularly so where the instrument systems are operated at high temperatures, especially temperatures above about 200° C. At higher temperatures, distortion between the movable members and fixed portions of the valves becomes commonplace, and fluid flow becomes erratic. Back-mixing becomes prevalent. Moreover, galling, chipping, gritting, sticking, and binding between the members of such devices becomes commonplace and, of course, regulation of fluid flow becomes impossible. At relatively high pressure, especially relatively at high differential pressures, operation is similarly difficult.

There is then an acute need for new and improved capillary flow valves, especially for those of a type suitable for the needs of modern analytical instruments, and instrument systems.

Accordingly, it is the primary object of the present invention to obviate the foregoing difficulties by providing new and novel capillary flow valves of very low internal volumes sufficient to provide streamlined flow without significant back-mixing of the flowing fluids. In particular, it is an object to provide capillary flow valves of such capabilities for use in various combinations for initiating, controlling, and switching the flow of various fluids from one instrument to another, even at conditions wherein the instruments are at different operating pressures. Another object is to provide capillary flow valves for use in combinations suitable for isolation and separation, via careful selectivity, of various components from complex mixtures of flowing fluid streams. A yet further object is to provide valves capable of operating with high accuracy and precision even at high temperatures, viz., temperatures on the order of about 400° C. and higher, and even ranging as high as about 1700° F. where special materials of construction are used.

These and other objects are achieved in accordance with the present invention which contemplates new and novel capillary fluid flow valves. These valves include a member provided with a capillary opening into which is fitted a movable plunger. Forward of the plunger, and within the capillary opening, is a space forming a chamber within which the plunger can be projected or withdrawn. Openings communicating with the terminal ends of a conduit, or conduits, are provided into the chamber for carrying a fluid into and out of the chamber, and the plunger is movable therein for initiating and interrupting the flow of fluid through the chamber by opening or closing off the chamber to the openings.

In this preferred form, the forward end of the chamber of a valve is provided with a frusto conic opening which enters into one of the openings for carrying fluid through the chamber. In this embodiment, the forward terminal end of the movable plunger is tapered to mate with and close the frusto conic opening. The frusto conic opening is communicated with a capillary conduit, and the volumetric capacity of the chamber ranges from about 0.00005 to about 0.0005 milliliter, or more preferably from about 0.0001 to about 0.00025 milliliter.

Preferably, also, the valve chamber is provided with a side opening into which is fitted another capillary member, or conduit, and all of the capillary members are rigidly held together by alignment within a block.

In one embodiment the external or outside diameter of the plunger is smaller than the inside diameter of the capillary opening to provide an annular passageway which connects to the chamber. Preferably, the difference in diameters between the plunger and the capillary opening constituting the chamber ranges from about 0.2 to about 2 thousandths of an inch, and more preferably from about 0.5 to about 1.0 thousandth of an inch. The volumetric capacity of the annular space thus ranges from about 0.0001 to about 0.0035 milliliter, and more preferably from about 0.0005 to about 0.0020 milliliter. One end of the annular passageway, outside the chamber, is provided with a side opening, and to the side opening is connected an additional capillary member. Both the capillary conduit and the junction formed by entry of the additional capillary conduit into the annular passageway are housed within a block.

These and other features of the invention will be better understood by reference to the following detailed description, which makes reference to the enclosed drawings wherein.

Figure 1:
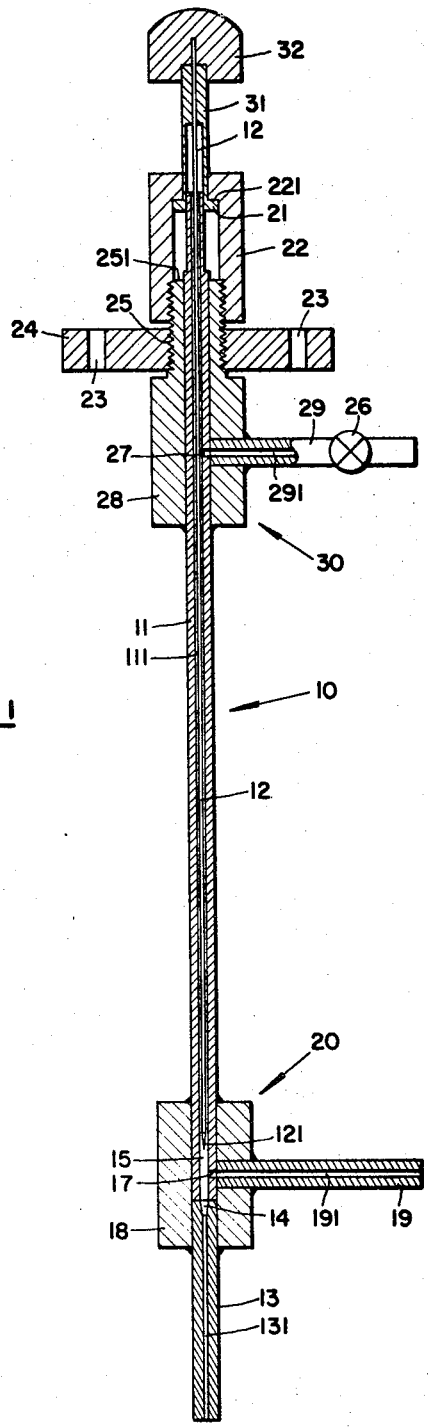
FIGURE 1 is a cross section elevation view of a preferred valve.

Referring to FIGURE 1 is shown a preferred type of capillary flow valve 10. A central portion of valve 10 is constituted of a capillary tube, or conduit 11. Within the opening 111, formed by the enclosing wall of the conduit, is located a slidable plunger 12. The primary function of plunger 12 is to initiate and interrupt the flow of fluid through conduits 13, 19 located at the branch connection 20. Branch connection 30 provides an optional flush connection, which is a preferred feature. This connection permits flow of a flushing fluid through opening 291 of capillary member 29 and through an annular portion of opening 111. Valve 10 is generally mounted so that the branch connection 20 is within a heated zone, while the branch connection 30, or flush connection, is mounted outside the zone.

Capillary conduit 11 is a tubular member having an internal opening 111 of extremely small diameter. The internal diameter ranges preferably from about 10 thousandths of an inch to about 20 thousandths of an inch and, more preferably, from about 15 thousandths to about 18 thousandths of an inch to obtain flow patterns wherein back-mixing of fluid is insignificant. A further feature thereof is that the capillary conduit 11 can be constructed of stainless steel to provide high operating temperatures, viz., on the order of about 400° C. Where constructed of more noble metals—viz., tungsten or platinum—operating temperatures can even approach three or four times this temperature.

A plunger 12, which is capable of limited movement, is mounted within capillary opening 111. In certain instances, i.e., where a flushing fluid is unnecessary, the external diameter of plunger 12 can approximate the internal diameter of capillary opening 111. It is generally preferable, however, to provide a flush connection, and in this instance the plunger 12 is of smaller outside diameter than the internal diameter of capillary opening 111, this providing an annular passageway through which fluid can be passed. The differential size between the outside or external diameter of plunger 12 and the internal diameter of opening 111 should range no higher than about 2 thousandths of an inch, and preferably from about 0.5 thousandth to about 1.0 thousandth of an inch. This differential provides an annular passageway of optimum size, permitting continuous and uninterrupted flow of fluid, if desired, through opening 291 of capillary member 29 to chamber 15 of capillary member 11, said chamber 15 being located forward of the tip 121 of plunger 12 and within branch connection 20.

The branch connection 20 is formed from a capillary member 13 which is tightly abutted against capillary member 11 so that passageways 111, 131, respectively, are precisely concentrically aligned to provide a contiguous and continuous passageway. It also includes a capillary conduit 19 which is vertically abutted against the tubular member 11 so that the opening 191 of the latter is in alignment with the side opening 17 through the wall of tubular member 11. The openings 131, 191 thus form, with chamber 15, a continuous passageway for flow of fluid when forward portion 121 of plunger 12 is withdrawn, as shown in the figure.

It will be observed that the capillary opening 131 of capillary member 13 is of smaller internal diameter than that of passageway 111. The passageways are thus generally sized so that the cross-sectional opening through the annular passageway 111 approximates that of passageway 131. In other words, the open volume of any given segment of the opening 131 should approximate that of a segment of equal length of the annular portion of the passageway through opening 111. It will also be noted that the member 13 is provided with a frusto conic shaped entry feature 14 which provides a seating feature for terminal end 121 of plunger 12, and constitutes as well a smoother flow transition feature. Thus, the plunger 12 can be projected forward into chamber 15 and into the frusto conic opening 14 to close off the flow of fluid through opening 131 of capillary member 13. Or, on the other hand, the dispensing end 121 of plunger 12 can be partially withdrawn from the frusto conic opening 14 to limit or apportion the flow of fluid through the opening, or freely retracted or withdrawn altogether to permit full flow of liquid.

A feature of the construction of the branch connection 20 is that the capillary members 11, 13, 19 are forcibly abutted together and held tightly in place by virtue of the block 18 into which the capillary members are mounted. In the construction, the members are pressed into the block tightly and forcibly abutted together and rigidly held in place, to some extent, by solder connections. Generally, the actual distance between the members can be held to not more than about 0.010 thousandth of an inch apart. The block 18 is preferably constructed of bronze or brass.

Branch portion 30, a preferred feature, provides a flush connection. The conduit 29 is adjoined to conduit 11 so that opening 291 thereof is in alignment with side opening 27 within the wall of conduit member 11. Fluid can be continuoulsy passed via opening 291 of valved conduit member 29 into the annular passageway 111 from whence the fluid flows toward the branch connection 20. A tubular seal (not shown) located within opening 111, through which plunger 12 is passed, prevents flow of fluid in the opposite direction. Conduit member 29 and conduit member 11 are also forcibly abutted or adjoined together and rigidly held within block 28, in which they are soldered for additional support. The block 28 is further provided with an externally threaded shank 25 for threadable connection to a mounting flange 24 provided with holes 23 for connection of the mounting flange 24 with, e.g., an instrument panel.

The "wire-like" plunger 12, provided with a thumb button 32, is projected into opening 111 and retained in place for guided limited movement within opening 111 by means of a retainer and guide member 22. A guide portion 31, of relatively large diameter, retains and aligns the plunger 12 upon opening 111, the guide portions 31 being a sub-assembly of retaining member 22. Retainer and guide member 22 is threadably connected with the externally threaded shank 25 and is employed for maintaining and preserving alignment of the small diameter plunger 12 with passageway 111. It will be observed that the movement of the plunger 12 within the capillary member 11 is limited by a stop member 21 which moves within retainer and guide member 22. Thus, in the open position, as shown in FIGURE 1, stop member 21 will abut against the forward wall 221 of retainer and guide member 22. Conversely, in closed position, stop member 21 will impinge upon face 251 of shank 25 to limit the forward movement of plunger 12 which, in this position, will have caused terminal end 121 of plunger 12 to become seated within frusto conic opening 14.

A key and novel feature of the invention resides in the extremely low internal volume of the entire capillary flow valve. In accordance therewith, the entire volume of the chamber 15, located at the junction between openings 131, 191 of capillary members 13, 19, respectively, ranges no greater than from about 0.00005 milliliter to about 0.0005 milliliter, and preferably no greater than from about 0.0001 milliliter to about 0.00025 milliliter. Even the additional internal volume provided by the annulus which provides the flushing feature does not add substantially to the total volume. In any event, though, the additional volume is not detrimental, and does not adversely affect the flow of fluid through conduits 13, 19. In fact, even when providing the flushing feature, the additional volume added by provision of the annular space within conduit member 11 adds no more than about 0.0002 milliliter to about 0.003 milliliter, and generally from about 0.0005 milliliter to about 0.002 milliliter, to the total internal volume of the valve. In providing such volumes, the length of capillary member 11 ranges from about one-half to about four inches. In operation of the valve, back-mixing of fluid drawn from an analytical instrument is virtually nil.

Figure 2:
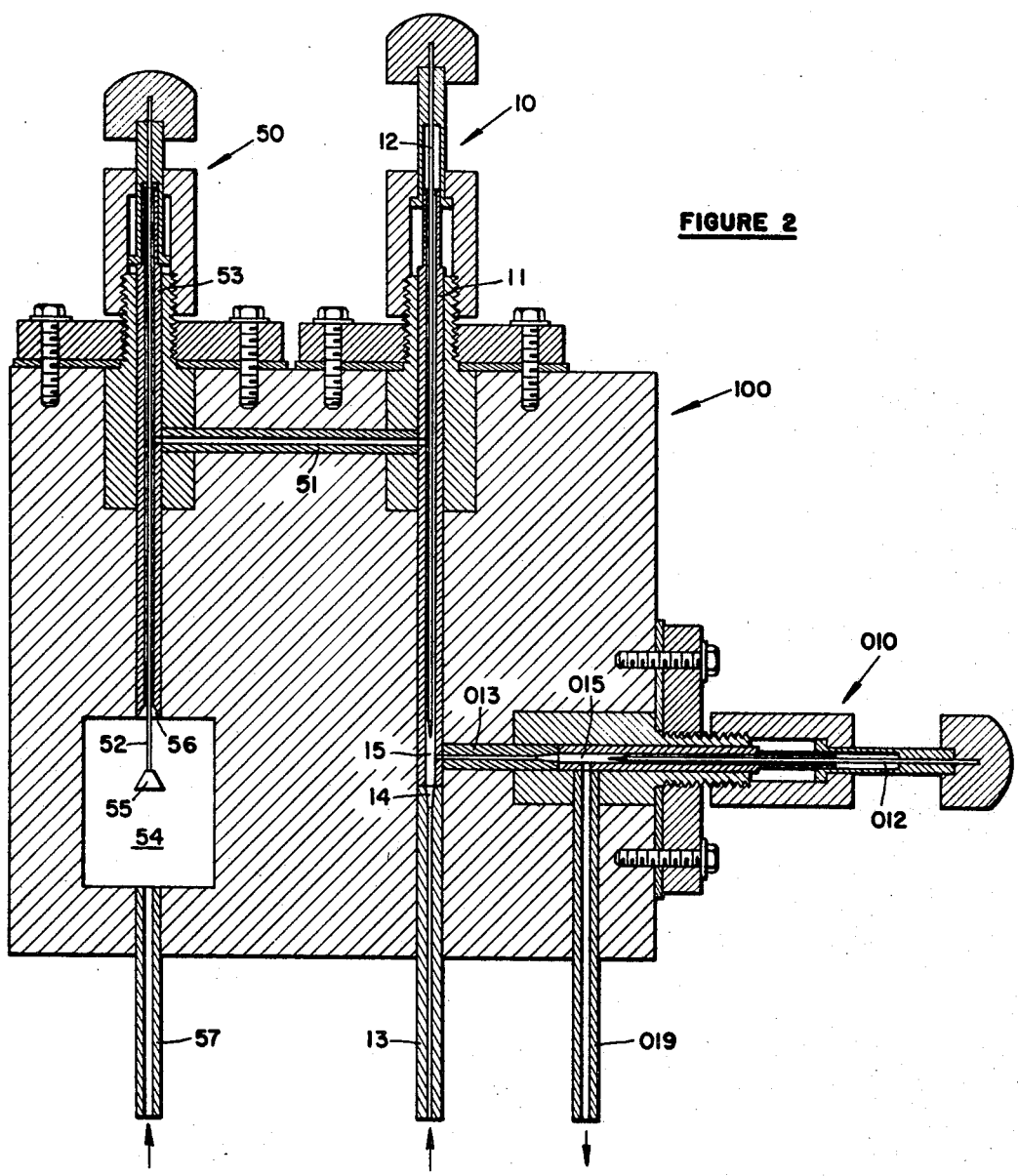
FIGURE 2 shows the use of a pair of these valves in combination.

By reference to FIGURE 2 is shown a preferred method of using a pair of the low internal volume valves of this invention. The valve 10 of FIGURE 2 is substantially identical to that shown by reference to FIGURE 1 of the drawings, and identical numerals are used to show corresponding parts. A second valve, 010, is also substantially identical to the valve 10 of FIGURE 1, and is shown in combination with valve 10. Numerals, corresponding to those used in connection with FIGURE 1, are also employed to designate similar parts, except that each numeral is preceded by a "zero." A throttling device, or valve 50, constituting, per se, no part of the specific valves of this invention, is also shown in the combination. The purpose and function of each will now be explained by direct reference to FIGURE 2.

In the particular combinations shown, valves 010, 10 are contained within an encompassing structure 100 via suitable connections, as clearly indicated in the figure, and the combination is employed to divert a portion of a flowing stream from one analytical device to another, for more precise and further analysis of a particular portion of a primary feed stream to the gas chromatograph. Thus, e.g., fluid is withdrawn from a gas chromatograph (not shown) via withdrawal of plunger 12 from frusto conic opening 14 to produce flow through capillary conduit 13, chamber 15, capillary conduit 013 chamber 015, and into line 019 which leads to, e.g., a mass spectrometer. The gas chromatograph and mass spectrometer are operated at 15 pounds per square inch and $10^{-7}$ pounds per square inch, respectively. Because the gas chromatograph and mass spectrometer are operated at different pressures, a third valve 50 is employed to equilibrate the pressure within the lines between the two instrument systems. The line 57 is thus connected to a pump (not shown), and the pressure produced within the chamber 54 is regulated by a throttle device to regulate the pressure supplied to line 53. The stem 52, and consequently the solid frusto conic shaped member 54, can be moved into and out of entry 56 to conduit 53 to regulate the pressure supplied to the valves 010, 10.

Regulation of the throttling device thus produces the desired pressure drop within the annular opening 111 of valve 10. Fluid flows smoothly and without interruption for the desired period, after which time the flow can be stopped by closure of valve 10 or valve 010, or both, as desired.

The following is exemplary of a specific operation, and describes an operation in accordance with the combination shown by reference to FIGURE 2.

Tubular member 13 was connected to a gas chromatography system containing in part a chromatography column 300 feet in length and having a uniform internal diameter of 10 thousandths of an inch. A gas flow of helium measured at standard temperature and pressure about one milliliter per minute passed through the column and carried components of a complex mixture into tube 13. Adjustment of plunger 12 in frusto conic entry feature 14 permitted variation of pressures in the exit section of the chromatography column system from about 0.01 to about 20 pounds per square inch (referenced to vacuum) while excess gas was removed through members 11, 51, 53, 54 and 57 by a pump connected to member 57. A desired portion of the gas flow into chamber 15 was passed into member 013 upon adjustment of member 012, and thence through chamber 015 and member 019 into a mass spectrometer which was operating at $10^{-7}$ pounds per square inch absolute pressure. Response of the mass spectrometer to pulses of components in the gas stream emerging from the gas chromatography system corresponded in detail to responses of more conventional detection systems which operated totally at normal atmospheric pressure without usage of the capillary flow valves. Furthermore, the valves permitted complete isolation of the mass spectrometer, partial isolation so that major components in the flowing stream having weights of 1 to 10 micrograms could be conveniently studied, or minimum isolation so that trace components weighing one to ten picograms ($10^{-12}$ to $10^{-11}$ grams) could be studied.

It is apparent that the invention can be varied to some extent without departing the spirit and scope of the invention.

Having described the invention, what is claimed is:

1. In combination, a capillary fluid flow valve comprising
    a tubular member provided with a capillary opening therethrough forming a chamber having a volumetric capacity ranging from about 0.00005 to about 0.0005 milliliters,
    a frusto conic opening with the forward portion of the chamber,
    a lateral opening into the chamber for communication therewith of the terminal end of a conduit capable of carrying a fluid,
    a plunger movable within the chamber for seating and unseating within the frusto conic opening to close off the chamber to the lateral opening to initiate and interrupt fluid flow through the chamber,
    said valve chamber being formed from a pair of capillary members, one member containing an opening within which the plunger is fitted, the other containing the frusto conic opening within which the forward tapered portion of the plunger can be projected, and further, a side opening into the chamber to which is fitted another capillary member, said capillary members all being held together by alignment within a block.

2. The valve of claim 1 wherein the chamber is provided with a second and additional lateral opening into the chamber for communication with a conduit capable of carrying a flush fluid, said second opening being located upstream of the said first opening and frusto conic opening.

3. The valve of claim 2 wherein the plunger is of smaller external diameter than the diameter of the capillary opening constituting the annular passageway, the volumetric difference providing an effective flow area substantially equal to that through the frusto conic opening.

4. The valve of claim 3 wherein the junction formed where the additional capillary conduit is connected to the annular portion of the chamber is housed in a block.

5. The valve of claim 3 wherein the difference in diameters between the plunger and the capillary opening constituting the chamber ranges from about 0.2 to about 2.0 thousandths of an inch.

6. The valve of claim 5 wherein the volumetric capacity of the annular space ranges from about 0.0001 to about 0.0035 milliliter.

7. The valve of claim 3 wherein the volumetric capacity of the chamber ranges from about 0.00005 to about 0.0005 milliliter, and the volumetric capacity of the annular space ranges from about 0.0001 to about 0.0035 milliliter.

8. The valve of claim 7 wherein the volumetric capacity of the chamber ranges from about 0.0001 to about 0.00025 milliliter.

9. The valve of claim 2 wherein the plunger is provided with a stop and retained in place for guided limited movement within the chamber by means of a retainer and guide member.

10. The valve of claim 9 wherein the capillary conduit carrying the flush fluid abuts the second lateral opening to the chamber and the capillary members are held in alignment by a block, the retainer and guide member are characterized as a relatively large diameter member encompassing a terminal end of the plunger including the stop, said guide and retainer member is rigidly attached upon said block, and the plunger and stop are movable therein so that when the valve is in open position, the stop abuts the forward portion of the guide and retainer member, and, when the valve is in closed position, the stop abuts the opposite portion of the guide and retainer member.

References Cited

UNITED STATES PATENTS

| | | | |
|---|---|---|---|
| 168,783 | 10/1875 | Riley | 251—122 X |
| 637,468 | 11/1899 | Kitson | 251—122 X |
| 1,613,323 | 1/1927 | Green | 251—366 X |
| 1,766,554 | 6/1930 | Sieber | 251—122 X |
| 2,956,771 | 10/1960 | Shields | 251—205 X |
| 2,980,392 | 4/1961 | Greenwood | 251—205 X |
| 3,096,069 | 7/1963 | Rose | 251—205 |
| 3,139,262 | 6/1964 | Morris et al. | 251—205 |
| 3,320,975 | 5/1967 | Jovinall et al. | 251—205 X |

FOREIGN PATENTS

| | | |
|---|---|---|
| 923,116 | 4/1963 | Great Britain. |

M. CARY NELSON, *Primary Examiner.*

ROBERT C. MILLER, *Assistant Examiner.*